(12) United States Patent  
Muir (10) Patent No.: US 8,924,699 B2  
(45) Date of Patent: *Dec. 30, 2014

(54) BIOS PROTECTION DEVICE

(71) Applicant: Aristocrat Technologies Australia Pty Limited, North Ryde (AU)

(72) Inventor: Robert Linley Muir, Artarmon (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/011,206

(22) Filed: Aug. 27, 2013

(65) Prior Publication Data

US 2014/0075543 A1  Mar. 13, 2014

Related U.S. Application Data

(63) Continuation of application No. 12/234,323, filed on Sep. 19, 2008, now Pat. No. 8,533,442, which is a continuation of application No. 10/572,665, filed as application No. PCT/AU2004/001267 on Sep. 17, 2004, now Pat. No. 7,464,256.

(30) Foreign Application Priority Data

Sep. 18, 2003 (AU) ................................ 2003905097

(51) Int. Cl.  
*G06F 9/24* (2006.01)  
*G06F 11/30* (2006.01)  
*G06F 21/57* (2013.01)  
*G06F 21/44* (2013.01)

(52) U.S. Cl.  
CPC .............. *G06F 21/44* (2013.01); *G06F 21/572* (2013.01); *G06F 21/575* (2013.01)  
USPC ................... 713/1; 713/2; 713/187; 713/189

(58) Field of Classification Search  
CPC ...................................................... G06F 21/572  
USPC ........................................ 713/1, 2, 187, 189  
See application file for complete search history.

(56) References Cited

U.S. PATENT DOCUMENTS

| | | | | |
|---|---|---|---|---|
| 6,564,326 B2* | 5/2003 | Helbig, Sr. | ...................... | 726/34 |
| 7,000,249 B2* | 2/2006 | Lee | ................................ | 726/20 |
| 7,464,256 B2* | 12/2008 | Muir | ................................ | 713/1 |
| 7,986,786 B2* | 7/2011 | Ibrahim et al. | ................ | 380/277 |
| 8,533,442 B2* | 9/2013 | Muir | ................................ | 713/1 |
| 2002/0004905 A1* | 1/2002 | Davis et al. | .................... | 713/193 |
| 2002/0087877 A1* | 7/2002 | Grawrock | ..................... | 713/200 |

* cited by examiner

*Primary Examiner* — Vincent Tran  
(74) *Attorney, Agent, or Firm* — McAndrews, Held & Malloy, Ltd.

(57) ABSTRACT

A boot program held in a BIOS memory device of a processing system is authenticated. At system start-up, a BIOS protection device temporarily prevents execution of the boot program by the central processor of the processing system by control of address and data paths. The BIOS protection device interrogates the contents of the BIOS memory device to establish authentication. If the contents of the BIOS memory device are not authentic, execution of the boot program is prevented.

11 Claims, 8 Drawing Sheets

BIOS PROTECTION DEVICE

CROSS-REFERENCE TO RELATED APPLICATIONS

This application claims priority to, and is a continuation of, U.S. patent application Ser. No. 12/234,323 filed on Sep. 19, 2008, which is a continuation of, U.S. patent application Ser. No. 10/572,665 filed on Mar. 20, 2006, and Issued as U.S. Pat. No. 7,464,256, on Dec. 9, 2008, which is the National Stage of International Application No. PCT/AU2004/001267 having an International filing date of Sep. 17, 2004, which claims priority to Australian Patent Application No. 2003905097 filed Sep. 18 2003, the contents of which is incorporated herein by reference.

INTRODUCTION

The present invention relates generally to security in relation to software in gaming machines and in particular the invention provides a method of verifying a BIOS Rom prior to startup of a machine.

BACKGROUND OF THE INVENTION

U.S. Pat. No. 5,643,086 describes a method of securing a gaming machine such that unapproved software on the mass storage will not be executed. The BIOS chip responsible for booting the system checks the cryptographic digital signature of software it loads from the hard disk (or other device) and only if it is valid will the software be executed. It is possible to tamper with this system by modifying the software in the BIOS to eliminate the digital signature checking. This modification could be detected if the gaming machine is examined in detail, though this is not suggested in the prior art document.

Gaming regulations typically require that BIOS chips be socketed, so that regulators are able to easily verify the contents of the memory and detect such illegal tampering. However this does make it very easy to illegally modify the BIOS.

The use of custom hardware can protect against such BIOS modifications, but prevents the use of industry standard hardware, such as PC's. A smartcard for example is easily able to implement secure program memory.

The Microsoft X-BOX Game console is based on standard PC technology, with some modifications. One of the security mechanisms is to boot the CPU from a Small ROM embedded in the customized graphics controller, which is then responsible for authenticating the remaining BIOS software. The BIOS then goes on to provide security for the rest of the loading process. It is not feasible to tamper with the code in the custom graphics chip, and hence in theory provides a high level of security, however it is very difficult and expensive to customize such a significant part of the PC architecture.

U.S. Pat. No. 4,862,156 to Atari for a "Video Computer System" (a home game console) describes a security system in which digital signature authentication is performed on console games. If the check fails, part of the functionality of the console is disabled. Only if authentication passes is full functionality enabled.

U.S. Pat. No. 6,071,190 describes a method of improving the security off a gaming machine, and verifying the stored program therein. The security depends on the security of the BIOS.

US Patent application No 20030064771 "Reconfigurable Gaming Machine" describes a gaming machine in which security again is dependent on the BIOS.

U.S. Pat. No. 5,802,592 "System and Method for Protecting Integrity of Alterable ROM using Digital Signature" describes a system into which the BIOS is partitioned into alterable and unalterable parts. The CPU first executes the unalterable BIOS, which authenticates the alterable part. This system protects against tampered software in the alterable BIOS, but not against modifications to the unalterable BIOS (for example if it is physically replaced).

U.S. Pat. No. 5,844,986 "Secure BIOS" describes a system in which BIOS updates are cryptographically controlled, such that only authentic updates can be written to the BIOS memory.

U.S. Pat. No. 6,488,581 describes device for protecting a mass storage device (e.g. disk drive) against modification by filtering out unauthorized commands to the device.

US Government standard FIPS 140-1 "Security requirements for Cryptographic modules" describes, in section "4.11.1 Power-Up Tests" software/firmware tests in which software/firmware residing in a cryptographic module is cryptographically authenticated at power up. The same technique is used in gaming machines (e.g. U.S. Pat. No. 5,643,086), but is more secure due the physical security of the cryptographic module—i.e. it is not physically possibly to tamper with the boot program.

Each of these prior art arrangements either relies on the BIOS being secure or uses a non-standard hardware configuration that is incompatible with a standard PC hardware configuration.

U.S. Pat. No. 6,401,208 "Method for BIOS authentication prior to BIOS execution" by Intel Corp., describes a method of BIOS protection that results in a similar outcome to the arrangement of the present invention, however the method of achieving that result is quite different and more complex than that now proposed. The Intel proposal relies on a special modified mother board chip set and a processor which employs an op-code emulation bit to allow a data fetch to be disguised as an instruction fetch: This approach may not be accessible by smaller dedicated application developers, or at least, not at a reasonable cost.

The Trusted Computing Platform Alliance (TCPA) is a group of companies in the computing industry promoting new hardware/software extensions to the PC to enable more secure computing and digital rights management (DRM). TCPA enables an external computer to determine the exact software configuration of a PC. It is not required that the PC must boot particular software, only that the software that it does boot can be determined externally. While ideal for network connected DRM, as it lets a content provider permit downloads only to suitably configured machines, it is not sufficient for a gaming machine which should never be permitted to execute non-approved software, and is often not even connected to a network. Further the security of TCPA rests in part on the security of the BIOS against tampering, and this is not secure in the current PC standard. Securing the BIOS from tampering would require more extensive changes to the PC architecture standard. ("Trusted Computing Platforms TCPA Technology In Context", ISBN 0-13-009220-7).

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to a first aspect, the present invention provides a processing system comprising a central processor, a BIOS memory device and a BIOS protection device interconnected by address and data paths, wherein at start-up, the BIOS protection device takes control of the memory address and data paths and prevents execution of a boot program stored in the BIOS memory device until the BIOS protection device has verified that the boot program stored in the BIOS memory device is authentic.

According to a second aspect, the present invention provides a method of authenticating a boot program held in a BIOS memory device of a processing system comprising a central processor, the BIOS memory device and a BIOS protection device interconnected by address and data paths, the method comprising the steps of:

1) at start-up, the BIOS protection device temporarily prevents execution of the boot program by the central processor;

2) the BIOS protection device takes control of the address and data paths;

3) the BIOS protection device interrogates the contents of the BIOS memory device to establish if the contents are authenticated;

4) if the contents of the BIOS memory device are not authentic, the BIOS protection device continues to prevent execution of the boot program and prevents further operation of the central processor; and 5) if the contents of the BIOS memory device are authentic, the BIOS protection device relinquishes control of the address and datapaths and allows the central processor to execute the boot program in the BIOS memory device.

According to a third aspect, the present invention provides a BIOS protection device for connection to a processing system between a central processor and a BIOS memory device containing a boot program, the BIOS protection device including address and data path interface connection means, and an authentication processor whereby, when power is applied to the BIOS protection device, the BIOS protection device takes control of address and data path(s) to which it is connected and the authentication processor interrogates the BIOS memory device connected to the address and data path(s) to determine if the boot program contained in the BIOS memory device is authentic, and only if the boot program is determined to be authentic does the BIOS protection device release control of the address and data paths) to permit the central processor to execute the boot program.

In various embodiments of the invention, different address and data path interfaces may be used including serial interfaces, totally non-multiplexed buses, the Intel™ Low Pin Count (LPG) bus structure and various intermediate solutions, depending on other components used on the motherboard. The motherboard may use standard PC architecture or may be a non-PC configuration.

Preferably, the BIOS device includes a cryptographic digital signature located at a known location in the BIOS memory device and the BIOS protection device calculates the value of the signature (from the BIOS data and internal public key) and interrogates the BIOS to verify that the correct signature is present and corresponds with the boot program (or, a part thereof) stored in the BIOS device.

In one embodiment, the BIOS protection device also contains an internal memory device and while authenticating the BIOS contents, the BIOS protection device copies part of the BIOS memory device contents to the internal memory device and subsequently controls the address and data path(s) to bypass the BIOS device when the central processor attempts to access the copied part of the BIOS memory device contents.

Preferably at least one signal line of the Motherboard is interrupted by the BIOS protection device such that the motherboard is inoperative if the BIOS protection device is not present. In one preferred embodiment of the invention, the reset control circuit is provided in the BIOS protection device such that the board cannot exit the reset state if the BIOS protection device is not present.

Preferably also, the BIOS protection device will hold the reset signal in the reset (or, disabled) state while the authentication of the BIOS is performed. When the authentication is successful, the BIOS protection device releases the reset signal allowing the central processor to commence operation. In an alternative embodiment, the BIOS protection device inserts wait cycles to disable the central processor while authenticating the BIOS memory device.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENTS

It is unlikely that BIOS security of the type required by gaming applications and other sensitive applications will be built into the PC standard in the near future, because there is no real need for it in most applications. Hence the only way to get this level of security is to customize the PC standard, and the embodiments of the present invention described below achieve this in a relatively inexpensive mariner.

A PC is not designed for security and security against BIOS modification has not been a concern for the mainstream PC market. Prior to this invention the only way to incorporate this level security was by directly incorporating it into the chips which make up the PC, as was done with the Microsoft X-BOX. It is not feasible for a niche industry user to influence the PC industry to incorporate BIOS security into the PC standard, or to go to the expense of modify existing PC standard chips.

Embodiments of the invention are described below with reference to gaming machines, however embodiments may also be useful in other fields where a higher level of security is required, while using standard commercial designs. An example might be ATM machines used in the banking industry. It would also be useful in implementing TCPA without making significant changes to the PC architecture standard.

Referring to FIGS. 2 to 10 of the drawings, embodiments of the invention provide BIOS protection in a processor by using a device which is transparent to the normal operation of the rest of the hardware, enabling the use of standard hardware components. It can easily be built into an otherwise standard PC motherboard and provide a high level of security.

Figure 1:
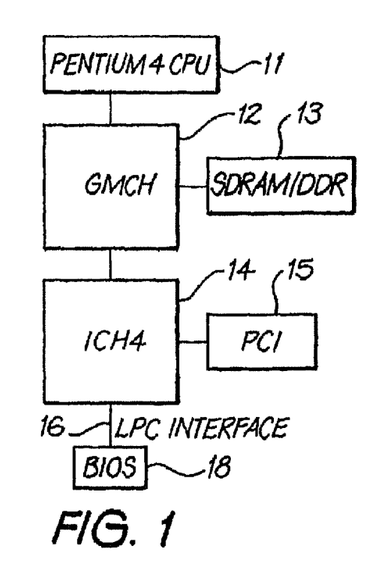
FIG. 1 is a block diagram of a standard PC without BIOS protection.

FIG. 1 shows a standard PC architecture which employs a commonly used standard PC motherboard chipset (the Intel 845G chipset), which is comprised of two chips, the graphics and memory controller hub (GMCH) 12, and I/O controller hub (ICH4) 14. The BIOS 18 is interfaced via the ICH4 using the Intel standard low pin count (LPC) interface 16. One such BIOS chip is the STMicroelectronics M5OFW040. In FIG. 1, the processor is a Pentium 4 CPU 11 which interfaces to the remainder of the system via the GMCH 12. Memory 13 is also connected to the GMCH as is the ICH4, 14.

Figure 2:
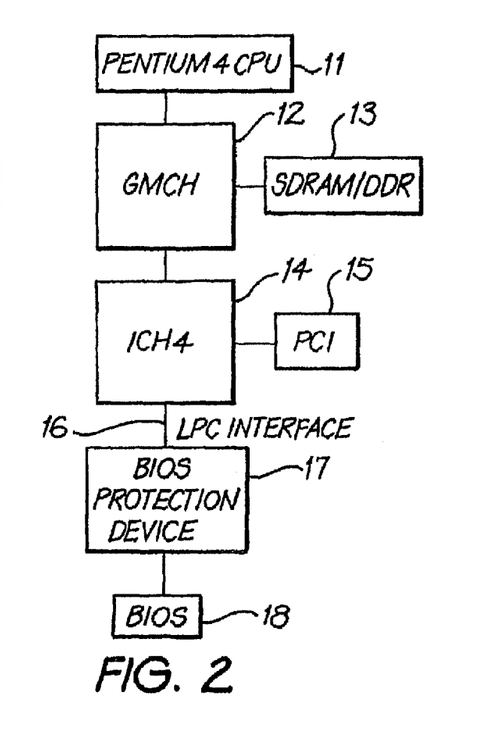
FIG. 2 is a block diagram of PC with BIOS protection according to an embodiment of the present invention.

Referring to FIG. 2, in one preferred implementation of the present invention, a BIOS protection device 17 is provided in an otherwise standard PC hardware configuration (i.e. the configuration of FIG. 1), the BIOS protection device being an integrated circuit inserted between an I/O controller 14 and the BIOS memory device 18. This arrangement is shown in more detail in FIG. 3, in which it can be seen that the LPC interface can be used between the ICH4 14, the BIOS protection device 17 and BIOS 18. The BIOS protection device 17 appears to the ICH4 14 as if it were a BIOS device, and the BIOS protection device 17 appears to the BIOS 18 as if it were an ICH4 device.

Figure 4:
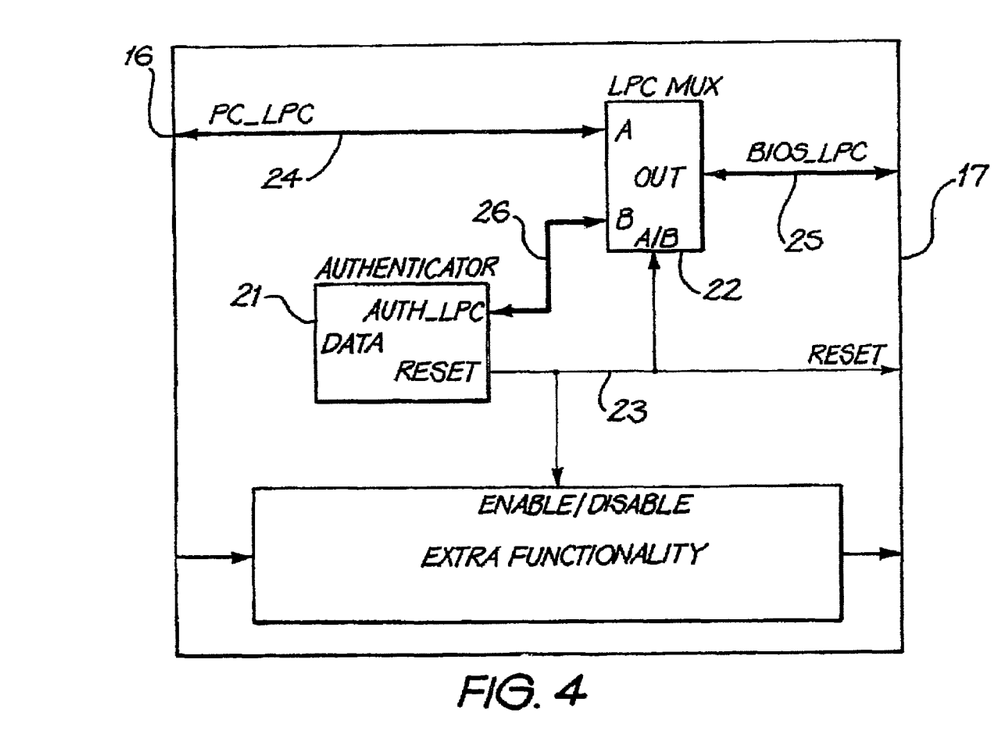
FIG. 4 is a block diagram of a protection device used in standard PC embodiments of the invention with an LPC BIOS device.

Referring to FIG. 4, the LPC interface 16 employs multiplexed address and data lines between the I/O controller hub 14 and the BIOS memory device 18. Address and data information on the internal (PC side) LPC bus 24 passes to the "A" input of an LPC multiplexer 22, within the BIOS Protection device 17, and depending on the state of the multiplexer 22 passes to the internal (BIOS side) LPC bus 25. The LPC Multiplexer 22 is a bi-directional switch which provides a bi-directional connection for multiplexed addresses and data between either of the inputs 'A' & 'B' and the 'output' depending on the state of the A/B input which in this case is controlled by the reset line 23. The 'B input' of the LPC multiplexer 22 is connected to the authenticator 21 by a further internal LPC bus 26. The authenticator 21 contains the reset circuit for the motherboard and holds the motherboard in a reset state while authentication takes place.

After power on, the protection device enters the verification mode where it verifies the contents of the BIOS. While in verification mode the authenticator 21 within the protection device asserts the reset line 23 to hold the rest of the motherboard in reset while the BIOS is being interrogated and to provide enhanced security in the event that authentication fails. Alternately, to prevent malfunction, instead of using the reset function, the protection device can insert wait cycles into external BIOS access until authentication is successfully completed. While in reset the multiplexer circuit 22 routes the address from the authenticator to the output and hence BIOS 18, allowing the authenticator to read the contents of the BIOS from the LPC bus 16/25. After authentication has been successful and reset is negated, the multiplexer routes the address from the ICH4 14 to the BIOS 18, allowing the CPU 11 to read the BIOS 18. The external circuit used would be similar to that shown in FIG. 3, where the existing circuit uses an ICH4 device.

In normal operation, after the BIOS has been successfully authenticated, the protection device is transparent to the operation of the standard ICH4 and BIOS devices, and has no effect on the functions of the motherboard. Standard software verification techniques can then be used to provide further protection for the application software running on the processor.

To authenticate the BIOS, the BIOS protection device 17 reads the contents of the BIOS chips 18 and verifies that the contents are valid against a cryptographic digital signature embedded in the BIOS at a known location. The public key of the signature is stored in the authenticator 21 of the BIOS protection device 17 where it cannot be tampered with. If the BIOS is successfully authenticated the BIOS protection device moves to its transparent mode of operation and releases the reset and enables any extra functionality provided within the protection device. If authentication fails the BIOS protection device enters the error mode, where access to the BIOS is disabled, the system remains in reset, and any extra functions of the protection chip are disabled.

Therefore even in a physical arrangement where it is easy to access and modify the contents of the BIOS, security is preserved.

The arrangement described above, allows industry standard designs to be easily enhanced to support a much stronger level of security against tampering. A single security device can be used to protect multiple different boards, requiring only that the board's memory interface be supported.

With the arrangement described above, while it would still be possible to tamper with the BIOS by replacing the protection device with a substitute circuit that did not have protection, this is much more difficult than simply removing a socketed BIOS device as is possible with existing systems.

The protection device may incorporate further unrelated functions of the board, such that if it were removed it would be difficult to duplicate its functions. Preferably these functions would be necessary to the operation of the board, and are disabled if the BIOS verification fails. Hence the protection device cannot be easily replaced by a simple circuit without the protection feature as this would require that the extra functions must also be duplicated. In a simple example the reset control circuit for the board is implement in the protection device, and any replacement device would have to replicate the reset function for the motherboard to operate.

To make tampering even more difficult, the protection device should be soldered directly to the circuit board, such that it is difficult to remove. Although it is possible to remove when it is soldered in, it is relatively time consuming and risks damage to the board, and is therefore expensive and/or increases the chance of detection.

Figure 5:
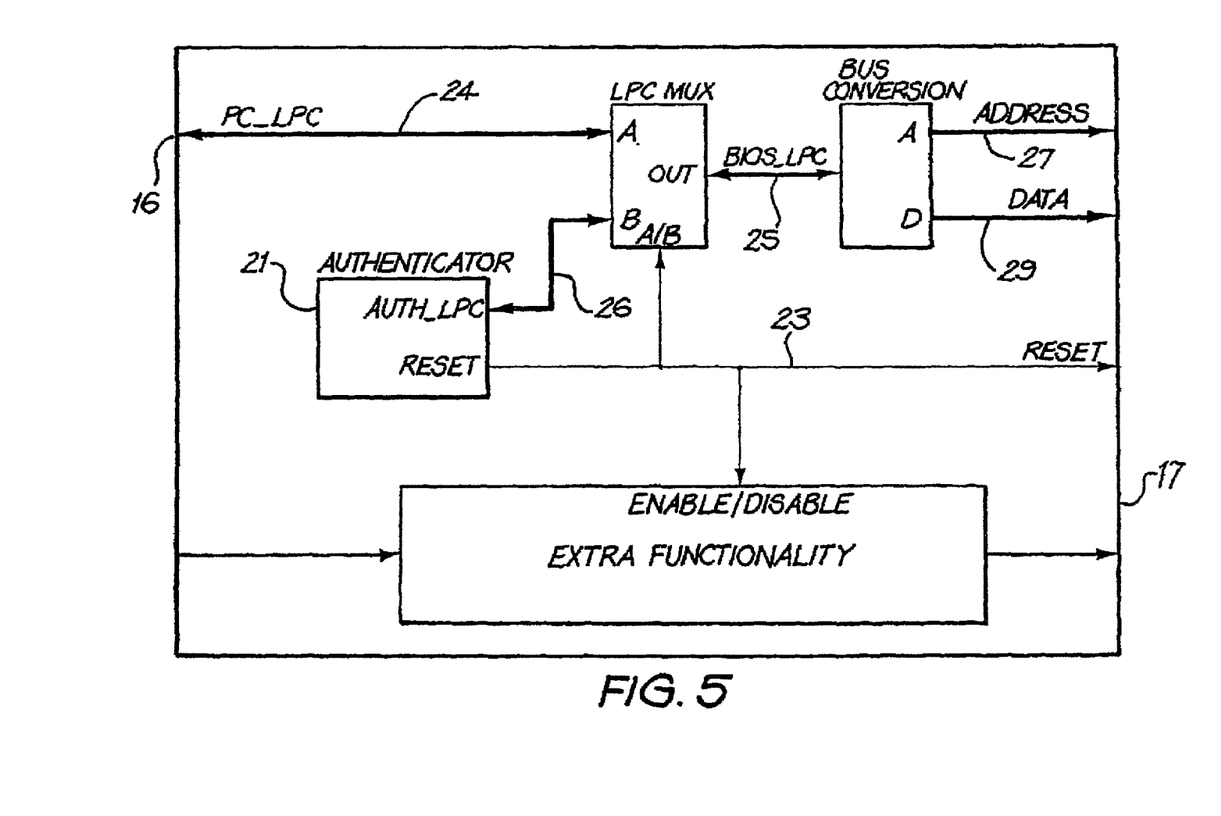
FIG. 5 is a block diagram of a protection device used in standard PC embodiments of the invention with an EPROM BIOS device.

Referring to FIG. 5, the protection device may convert from one BIOS hardware interface to another. This may be a useful function itself, allowing a different memory device to be used than the standard one. For example using a PC in gaming application it may be preferred to use a PC chipset, such as the Intel 845G with LPC BIOS interface 16, and EPROM in DIP package for the BIOS chip 18. The EPROM has the advantages (in gaming applications) of being physically easier to handle and is unable to be reprogrammed in circuit. This also enhances security, as it is a significant function that must be replaced if the protection device is to be removed. To achieve this, the protection device 17 would include a bus converter 28 which multiplexes/de-multiplexes the internal LPC bus 25 to create a separate address bus 27 and data bus 29 carrying address and data signals to and from the BIOS device 18.

Figure 6:
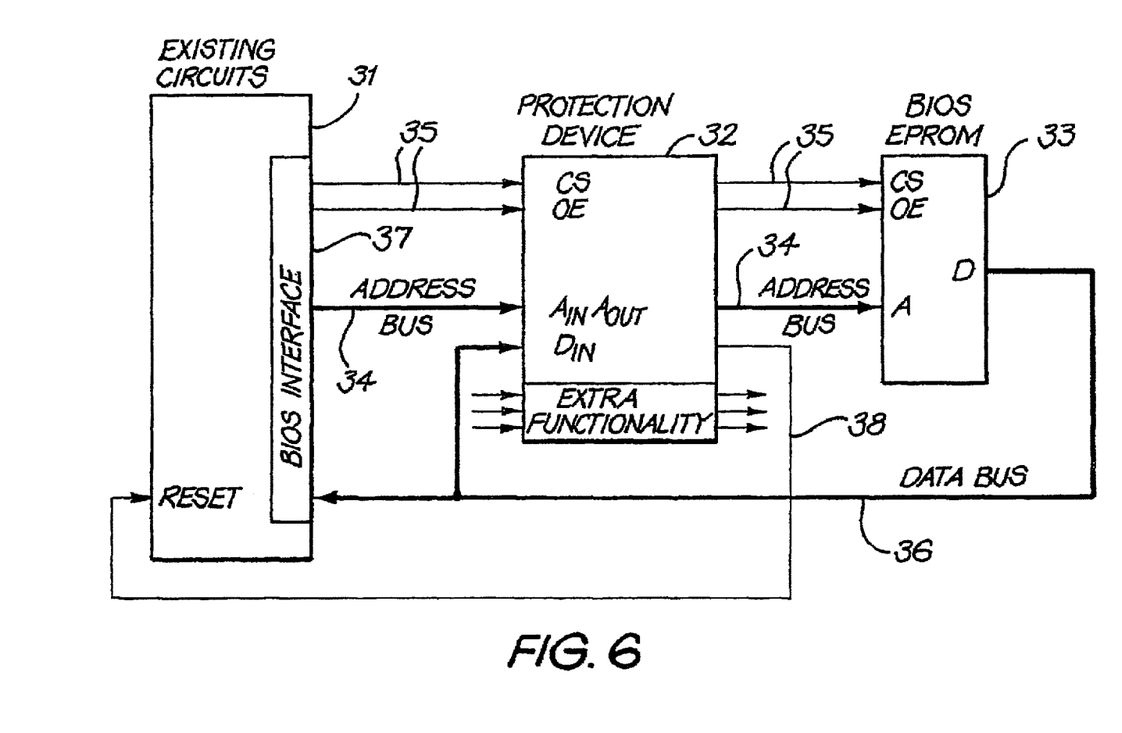
FIG. 6 is a block diagram of a BIOS protection device according to an embodiment of the present invention in a non-PC platform.

In another example, a gaming machine such as the Aristocrat Technologies Mk6 product uses EPROM to store the game. Referring to FIG. 6, the protection device 32 may be implemented between the CPU and EPROM 33 and to the CPU the protection device will appear as a direct interface to the EPROM when in transparent mode. Further, the Mk6 product uses a Field Programmable Gate Array (FPGA) to interface the CPU bus and EPROM, and (with minor modifications to the board) the protection device can be integrated into the FPGA. This FPGA controls a large proportion of the functionality of the motherboard and would be very difficult to replace.

Figure 3:
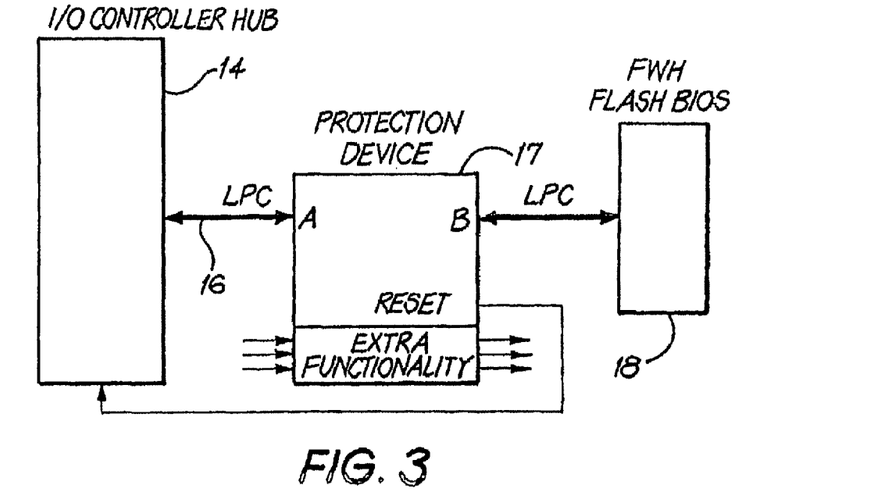
FIG. 3 is a block diagram of a BIOS protection device according to an embodiment of the present invention in 'Standard PC'.

FIG. 3 shows the entire BIOS memory interface passing through the protection device. It is also possible to simply tap the protection device onto most of the signals provided that the standard memory interface is not driven when in reset (when the protection device needs to drive the signals). A reduced pin count protection device could be cheaper to implement. If none of the signals is interrupted by the protection device 17 it can simply be removed leaving a functioning but unprotected circuit. Therefore, at least one signal should be interrupted by the protection device 17, but in some implementations it may be not necessary to interrupt all signals to provide an adequate level of security. The circuit of FIG. 6 shows a trade-off where the EPROM address and control signals 34, 35 are interrupted between the BIOS interface 37 of the I/O controller 31 by the protection device 32, but the data signals 36 and the BIOS device 33, are not. The reset signal 38 is again preferably generated by the protection device 32. This will typically save 8 or 16 pins on the protection device, but is still secure. The data lines 36 must still be connected to the protection device 32 to enable the BIOS memory 33 to be read and the signature verified.

Figure 7:
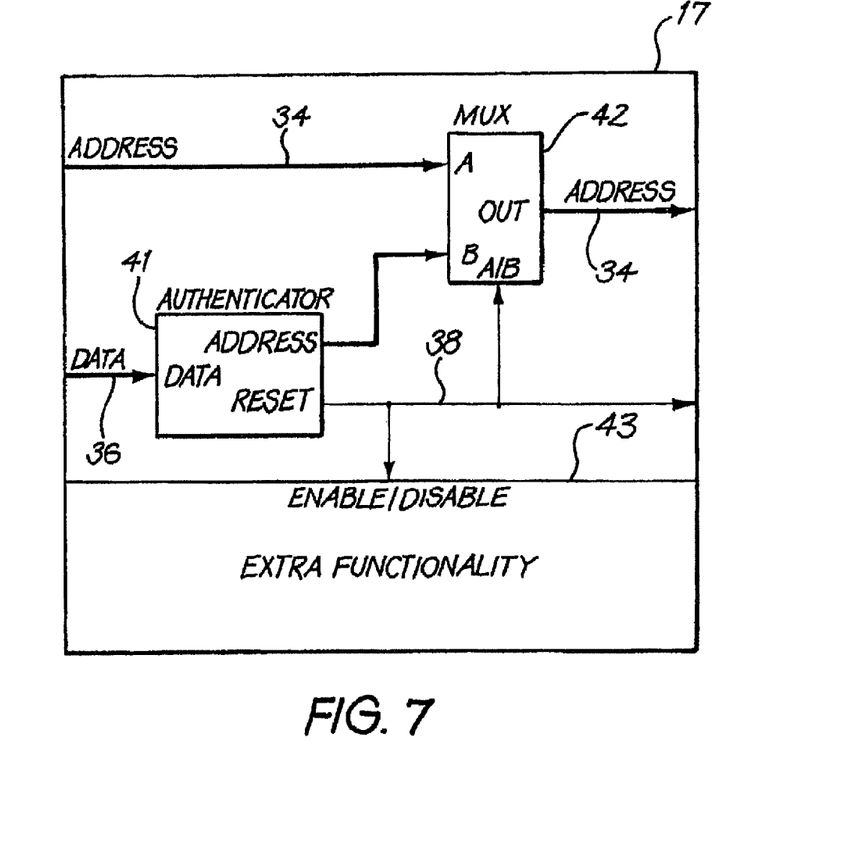
FIG. 7 is a block diagram of a protection device for EPROM used in non-PC embodiments of the present invention.

Referring to the block diagram of FIG. 7, the simple implementation for an EPROM based BIOS (with separate address and data lines) of the type used in FIG. 6 is illustrated. The protection device consists of an authenticator 41, address multiplexer 42, and optional extra functionality 43. The authenticator 41 controls the modes of the protection device 31 and performs cryptographic authentication of the contents of the BIOS 33 (of FIG. 6). The reset signal 38 is also generated by the authenticator 41.

In gaming applications regulators often require that memory devices are not capable of being updated in the gaming product, but many modern systems are capable of electronic updating of the BIOS. The protection devices 17, 32 need not affect the operation of BIOS firmware update, but if required, firmware updating can easily be disabled by arranging the protection devices 17, 41 to not pass updates to the BIOS 18, 33.

Protected Program Storage

One possible attack on the security provided by a protection device of the type described above, is to provide an external circuit with two BIOS's, an authentic original and a tampered version. While the protection device 17, 41 authenticates the BIOS (and the board is held in reset) the authentic BIOS is enabled into the circuit, and when the board is not reset the tampered version is enabled instead. Thus the protection device authenticates one device and the CPU executes the other. While such an attack would be difficult to perform undetected, it is theoretically possible.

Figure 8:
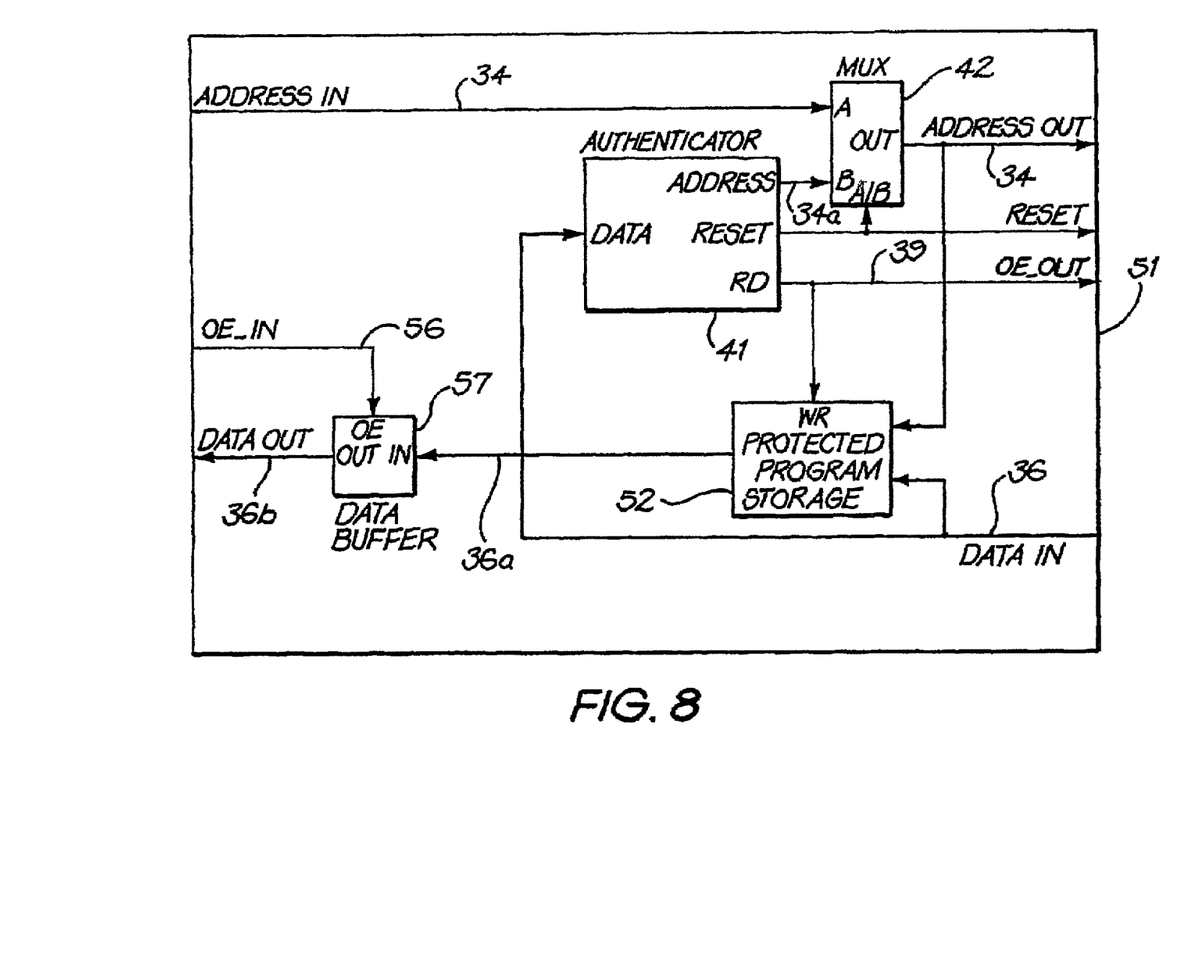
FIG. 8 is a block Diagram of an EPROM BIOS protection device with full protected storage according to an embodiment of the present invention.

Referring to FIG. 8, an enhanced protection device 51 incorporates an internal program storage memory, called the protected program storage 52, into which BIOS data is copied as it is authenticated. Once successfully authenticated, all CPU access to the authenticated region of BIOS memory accesses the copy in the protected program store 52 instead of the BIOS chip 18, 33. Hence swapping an authentic BIOS chip for another will not affect security.

The board is held in reset by asserting the RESET signal 38, while the authenticator 41 reads the BIOS EPROM 18, 33 by asserting the OE_OUT signal 39 and reading data via the DATA IN bus 36, while at the same time writing the read EPROM data to the protected program storage memory 52. When the reset signal 38 is asserted the address multiplexer 42 selects the address 34a from the authenticator 41 to be output allowing the authenticator 42 to read the BIOS device 18, 33, while when reset signal 38 is negated the multiplexer 42 selects the address 34 from the main CPU 11, allowing the CPU to read the BIOS 18, 33. Once the authenticator 41 has successfully authenticated the BIOS data the RESET signal 38 is negated to enable normal operation of the CPU 11. Data out 36l) to the CPU 11 passes through a tri-state buffer 57 which is enabled by the OEIN signal 56 from the CPU 11, while the OE_OUT signal 39 is always generated by the authenticator 41 because all reads to the BIOS 18, 33 are initiated via the protection device 51.

Ideally the entire contents of the BIOS 18, 33 will be authenticated and stored in the internal memory 52, however BIOS chip capacity is quite large and may be expensive to duplicate. To save cost a subset of the BIOS may be authenticated by the BIOS protection device 51, and the software in authenticated portion of the BIOS is responsible for authenticating the remaining part of the BIOS using cryptographic digital signatures when executed by the CPU 11. The authenticated subset is sufficient to authenticate and load the remaining BIOS into the computers main memory, from which it then executes.

Figure 9:
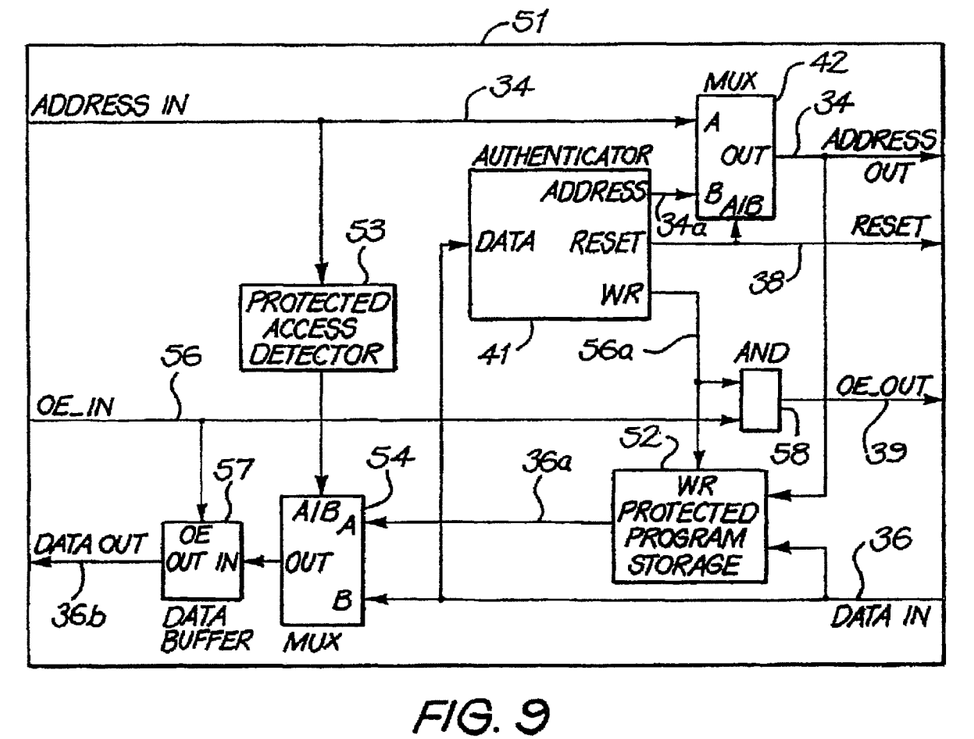
FIG. 9 is a block Diagram of an EPROM BIOS protection device with partial protected storage according to an embodiment of the present invention.

Referring to FIG. 9, a protection device is shown in which the protected program storage 52 has a smaller memory capacity than the external BIOS device 18, 33. The operation of this device is similar to that of FIG. 8, with the addition of a CPU address comparator (protected access detector) 53 and data multiplexer (MUX) 54. In this implementation only a portion of the BIOS device 18, 33 is authenticated, and this portion is read into the protected program storage 52, as previously described. When the CPU attempts to read the BIOS at an address that is within the range that has been authenticated, as determined by the protected access detector 53, the data 36a is returned to the CPU from the protected program storage 52, as selected by the data multiplexer 54. When the CPU 11 reads the BIOS at an address that is outside the range that has been authenticated, as determined by the protected access detector 53, the data 36 is returned to the CPU 11 from the external BIOS device 18, 33, as selected by the data multiplexer 54. Data out 36b to the CPU 11 again passes through a tri-state buffer 57 which is enabled by the OE_IN signal 56 from the CPU 11, however in the case the OE_OUT signal 39 is generated by gating the OE signal 56a from the authenticator 41 with the OE_IN signal 56 from the CPU in AND gate 58 such that the BIOS 18, 33 is only enabled when allowed by the authenticator 41 (i.e. when a read of non-copied content is required).

Prior to successful authentication the data bus to the CPU may be disabled to make it more difficult to tamper with the circuit. The data bus is not necessarily tri-state, since tampering with a driven data pattern is more difficult to tamper with than a tri-state bus.

Figure 10:
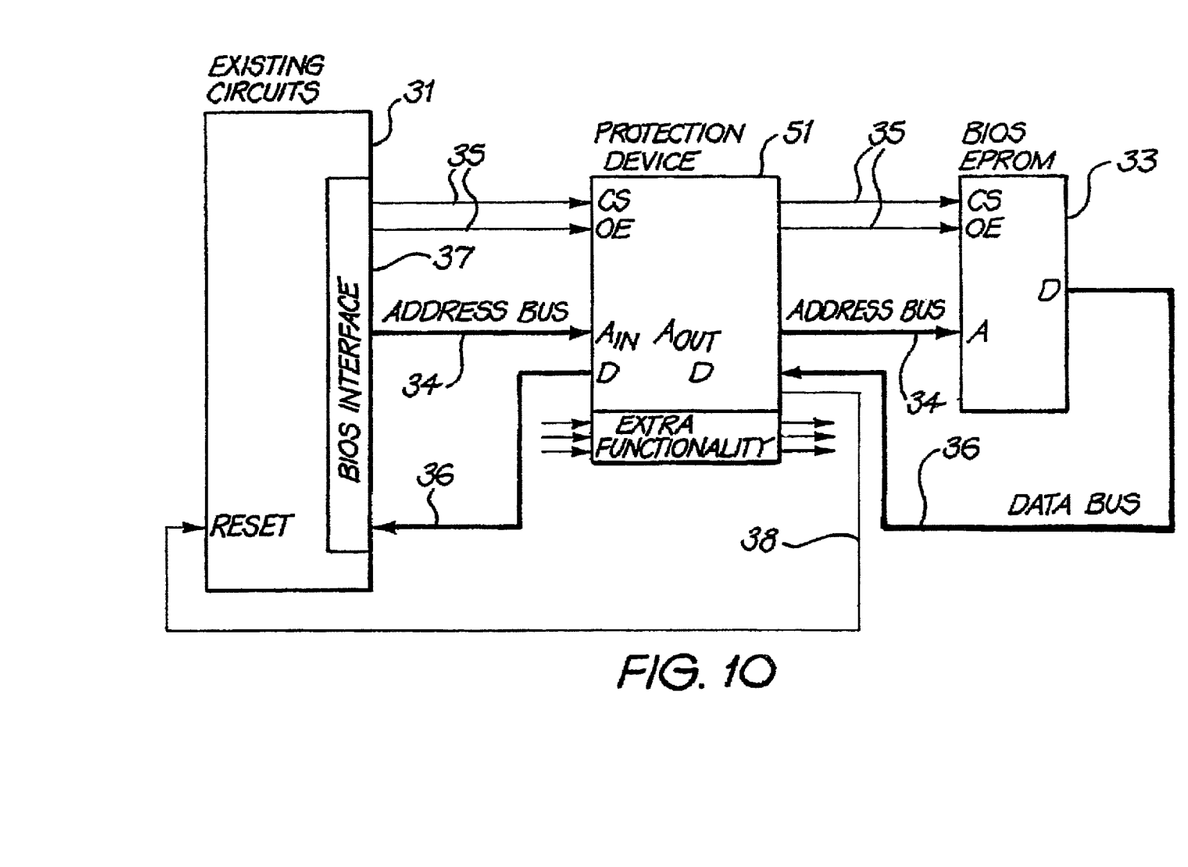
FIG. 10 is a block diagram of a BIOS protection device according to an embodiment of the present invention in a non-PC platform with a non-multiplexed address/data bus.

FIG. 10 shows the changes required to the circuit of FIG. 6 when the protection device 51 of FIG. 8 or 9 is used.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A processing system comprising:
   a central processor;
   a BIOS memory device including a boot program;
   a BIOS protection device including an internal memory;
   a memory address path and a data path, each configured to provide communication between the processor, the BIOS memory device and the BIOS protection device; and
   wherein the BIOS protection device is configured to store a copy of the boot program in the internal memory as the BIOS protection device verifies the authenticity of the boot program,
   wherein the BIOS protection device is further configured to control the memory address path and to disable the data path to the central processor to prevent execution of the boot program until the boot program is authenticated, and
   wherein the BIOS protection device relinquishes control of the memory address path and the data path to the central processor with access to the copy of the boot program from the internal memory for execution by the central processor when the boot program is successfully authenticated such that execution of the boot program is no longer prevented.

2. The system as claimed in claim 1 wherein the BIOS protection device is in communication between the central processor and the BIOS memory device, wherein the BIOS protection device includes a memory address path interface and a data path interface, and an authentication processor, wherein the BIOS protection device is configured to control the memory address path and the data path to which the memory address path interface and the data path interface are connected, and wherein the authentication processor is configured to interrogate the BIOS memory device connected to the memory address path and the data path to determine if the boot program contained in the BIOS memory device is authentic, and if the boot program is determined to be authentic permit execution of the copy of the boot program by the central processor.

3. The system as claimed in claim 2, wherein the memory address path interface connection and the data path interface are selected from a group comprising a serial interface, a totally non-multiplexed bus, an Intel™ Low Pin Count (LPC) bus structure.

4. The system as claimed in claim 3, wherein the memory address path interface connection and the data path interface comprise an Intel™ Low Pin Count (LPC) bus structure.

5. The system as claimed in claim 1, wherein the BIOS memory device includes a cryptographic structure located at a predetermined location in the BIOS memory device.

6. The system as claimed in claim 5 wherein the cryptographic structure is a digital signature and the BIOS protection device is configured to calculate the value of the cryptographic structure from contents of the BIOS memory device and an internal public key, and wherein the BIOS protection device interrogates the BIOS memory device to verify that a correct cryptrographic structure is present and corresponds with at least part of the boot program stored in the BIOS memory device.

7. The system as claimed in claim 1 wherein the central processor, the BIOS memory device and the BIOS protection device are mounted on a motherboard configured to be inoperative if the BIOS protection device is not present on said motherboard.

8. The system as claimed in claim 7, wherein said motherboard has an exitable reset state, and said BIOS protection device further includes a reset control circuit configured to provide a reset signal being responsive to said reset signal to prevent the motherboard from exiting the reset state, and wherein the motherboard is further prevented from exiting the reset state if the BIOS protection device is not present on said motherboard.

9. The system as claimed in claim 8, wherein the BIOS protection device is configured to hold the reset signal in the reset state while the authentication of the boot program is being performed.

10. The system as claimed in claim 9, wherein the BIOS protection device is further configured to release the reset signal allowing the central processor to commence operation when the authentication is successful.

11. The system as claimed in claim 1 wherein the BIOS protection device is configured to insert wait cycles to disable the central processor while authenticating the BIOS memory device.

* * * * *